F. W. Beers,
Raising Sunken Vessels.
No. 102,359.　　　　　Patented Apr. 26, 1870.
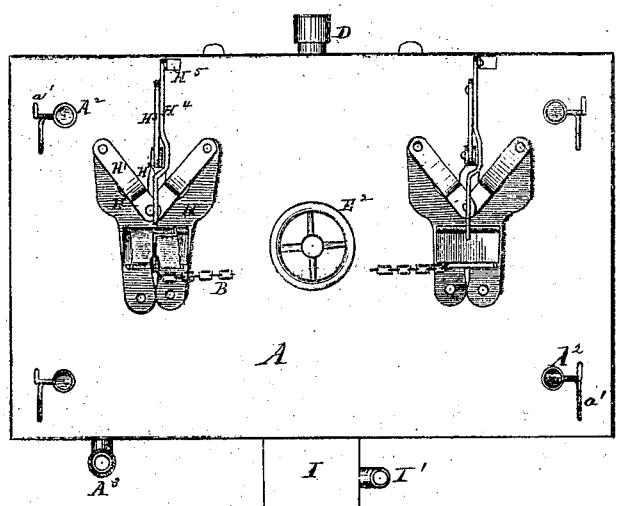
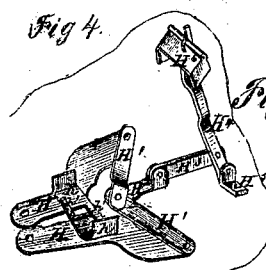
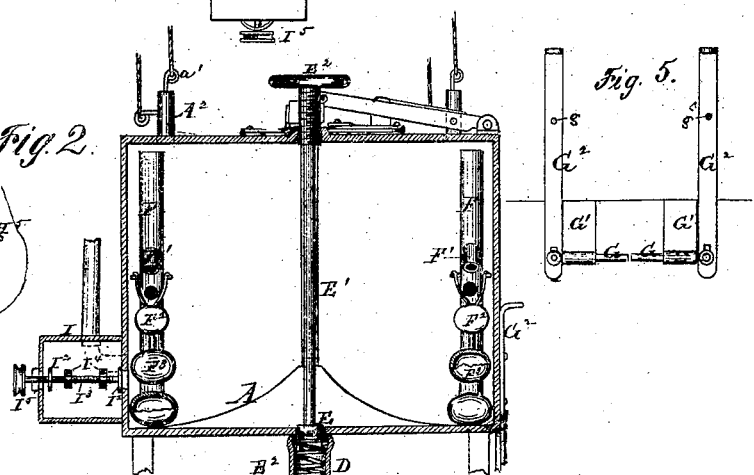
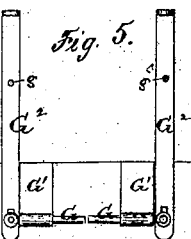
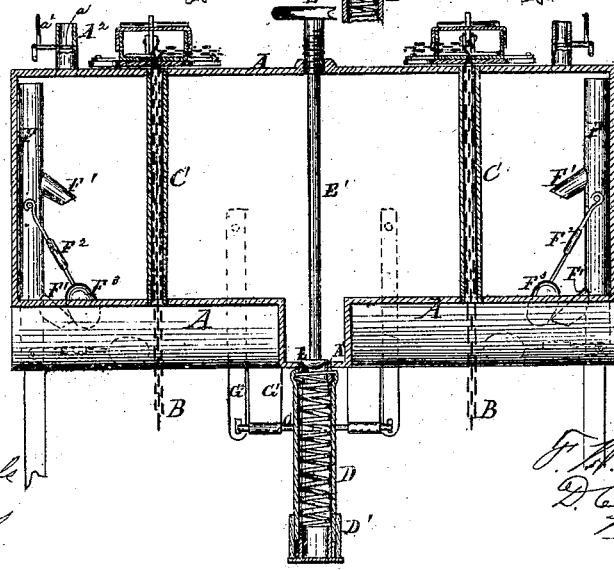
Witnesses　　　　　　　　　　Inventor:

UNITED STATES PATENT OFFICE.

FREDERICK W. BEERS, OF NEW YORK, N. Y.

IMPROVEMENT IN TANKS FOR RAISING SUNKEN VESSELS.

Specification forming part of Letters Patent No. 102,359, dated April 26, 1870.

*To all whom it may concern:*

Be it known that I, FREDERICK W. BEERS, of New York, in the county of New York, and in the State of New York, have invented a new and useful Improvement in Apparatus for Raising Sunken Vessels; and I do hereby declare that the following is a full, clear, and exact description thereof, reference being had to the annexed drawings, making part of this specification, in which—

Figure 1 is a plan view. Fig. 2 is a transverse vertical section. Fig. 3 is a longitudinal vertical section. Fig. 4 is a perspective view of the chain-stopper which is used in connection with the apparatus. Fig. 5 shows the device for supporting the flexible tube attached to the bottom of the apparatus.

The same letters are used in all the figures in the designation of identical parts.

This invention relates to that class of apparatus which is employed for raising sunken vessels and other property; and it consists in a tank of suitable capacity, and made airtight, two or more of which are sunk alongside a vessel, on chains passed under such vessel, after which the water which has been permitted to enter the tanks is expelled, and they are filled with air from the surface of the water, by means of suitable engines, until they acquire the necessary buoyancy to bring the sunken vessel to the surface.

My improvements consist in peculiarities of construction, combination, and arrangement of various parts of the apparatus, as will be more fully set forth in the following specification and claims.

To enable those skilled in the art to make and use my invention, I will proceed to describe its construction and operation.

In the annexed drawings, A represents the tank, which is to be made of a size to suit the conditions under which it is to be used. Any desirable kind of material may be taken for its construction which possesses the necessary strength, such as wood, iron, &c., and to add to its strength, when made of wood, it may be strongly braced by iron bands. The form shown in the drawings—a rectangular one—is preferable, but may be changed if found desirable. The joints must be made perfectly air-tight, and for this purpose the inside may be lined with rubber-cloth, tin, or other such like material. The form of the bottom of the tank is clearly shown in Figs. 2 and 3, it being in its central portion parallel to the upper wall, while upon each side of this straight portion it is curved from the sides to the center, so as to form, as it were, a continuation of the curvature of the bottom of the vessel, and thus enable the chains B B to lift the vessel without upsetting the tank, which would result if the bottom of the tank were made straight or parallel to the top wall. The chains B are passed through tubes C C from the bottom to the top of the tank, and thence upward to the wrecking-vessel, which is moored above the sunken vessel, and carries suitable machinery for forcing air into the tank through hose attached to short pipes issuing from the tank. The tubes C, of which two or more are used, are equidistant from the center of the tank and midway between the sides, and are joined air-tight to the same.

To a central aperture, A', in the bottom of the tank, a flexible tube, D, is attached, weighted upon its lower end, so that it shall always have a tendency to hang down, no matter what position the tank may assume. Its outer end is closed by a suitable stopper, D', which is removed when the tank is to be filled with water for the purpose of sinking it.

The aperture A' can also be shut by means of a valve, E, secured to the end of a vertical shaft, E', which has its bearings in and projects through the top wall of the tank. The upper portion of the shaft E' is screw-threaded and fitted to work air-tight in a female thread in the top wall of the tank, so that on revolving the shaft by means of the wheel E² the valve E upon its lower end can be made to open or shut the aperture A'.

When the tank is to be filled with water, the air escapes from it through pipes A² A², &c., issuing through the top wall, and which are provided with suitable valves, $a$, by which they can be shut. The stems of these valves project through the tubes, and are provided with bell-cranks $a'$, to which ropes are attached, so that the valves can be operated from the wrecking-vessel after the tank has been sunk. These ropes or chains I propose to mark off into feet, so that the position of the tank is by them indicated, enabling the wreckers to regulate the supply of air to the different tanks in such a manner that all parts of the vessel may be raised simultaneously.

To prevent the tanks from upsetting while being filled with water, I arrange in each corner a vertical pipe, F, closed at the bottom, but open on top, and provided with suitable branches F', to which valves F² are fitted. These valves are secured to rods or bars pivoted at one end to the pipes F and provided at the other with floats F³. When the tank is filled with air, their own gravity will carry the valves down, and thus leave the branches F' open; but as soon as the water is admitted the floats will carry the valves up and close the branches, thus keeping a volume of air in the pipes F below the surface of the water in the tank, and prevents the latter from upsetting. As soon as the tank gets nearly full, the water enters these pipes on top and displaces the air.

The flexible tube D is drawn up to the side of the tank when not in use, and is supported on sliding bolts G, which have their bearings in suitable hangers, G', suspended from the tank, and are operated by means of two levers, G², pivoted or fulcrumed on the tank at $g$, and connected at their lower ends to the sliding bolts, while ropes or chains are attached to their upper ends, by which to vibrate them, for the purpose of sliding the bolts under the tube when drawn up, or to draw the bolts apart, when the tube will drop.

Over each chain-tube C a chain-stopper is arranged upon the top of the tank. This chain-stopper is composed of two pivoted jaws, H, of the form substantially as shown in Figs. 1 and 4, their rear ends being connected to a short bar, H², by means of links H' H', forming toggle-joints. The bar H² is in turn connected by another link, H³, to the lever H⁴, which is fulcrumed to the tank at H⁵, and is used to operate the jaw, which, when the lever is borne down over them, causes them to come together and firmly clutch the chain.

Upon the top of the jaws H pieces of angle-iron $h\ h$ are secured directly opposite the chain-tube, which are provided with short projections or fingers $h'$ upon opposite sides, which serve to guide the chain. The vertical portions of these angle-irons are embraced by a clutch, H⁶, when the jaws are closed, so as to prevent them from opening and releasing the chain. This clutch H⁶ is pivoted to the upper end of the lever H⁴, as clearly shown in Fig. 4, and forms an extension thereof when brought in line with it, it being prevented from turning beyond such point by a stop, $h²$, on the end of the lever. The edge of the jaws where the chain is clutched is slightly beveled from the upper to its under surface, and a slight curve is also given to it at this point to enable such jaws, when a link of the chain comes between them edgewise, to give it a quarter-turn, and bring it flat between them, and have the succeeding link rest on and across the jaws.

The lever H⁴ may be operated by means of ropes or chains.

Air may be forced into the tank through a suitable hose connected to a short pipe, A³, issuing directly into the tank; or an additional box, I, may be arranged on the lower portion of one side of the tank, provided with a short pipe, I', to which to attach the hose. An opening is made in the wall of the tank, and another in the outer wall of the box I, in one horizontal line, one or the other of which is closed by valves I² I², secured to a screw-spindle, I³, in such relative positions as to permit one of the openings to be closed while the other is open. The screw-spindle is fitted in female threads in hangers I⁴ within the box, and carries a pulley, I⁵, upon its outer end, by which to turn it from the surface of the water by means of a rope or chain. The object in employing this additional box is to prevent the water from rising in the hose, and store a quantity of air to let into the tank when in position.

A man-hole, fitted with a man-head, is formed in the tank, through which access may be had to its interior for purposes of repair, &c. The tank is also provided with legs of sufficient height to prevent injury to the flexible tube and its supports when the tank stands upon the bottom of the ocean or river.

In operating these tanks, chains are first passed under the sunken vessel and brought up to the surface, where they are passed through the chain-tubes of two or more tanks. Hose connected at one end with a suitable condensing-engine is then attached to the pipe A³ or I', as the case may be, and the flexible weighted tube released from its support, and its stopper removed. The valves E and $a$ are then opened, when the water at once enters through the flexible tube, and soon fills the tank to such an extent that it sinks, guided on the chains. As soon as it has reached bottom the valves $a$ are closed, and the chain-stoppers made to firmly clutch the chains, when air may be forced into the different tanks upon each side of the vessel until all or a sufficient quantity of the water in them has been ejected through the flexible tube to give them the necessary buoyancy to lift the vessel. In case the box I is used in connection with the tank, the aperture in the wall of the tank is to be closed by one of the valves I² while sinking the tank, thereby opening the aperture in the box through which the water enters; but a quantity of air is kept in the box above the aperture, which, as soon as the tanks are in the proper position, is let into the tank by opening its aperture at the same time that the aperture in the box is closed.

What I claim as new, and desire to secure by Letters Patent, is—

1. A tank for raising sunken vessels, having its bottom formed substantially as shown and described, for the purpose set forth.

2. In combination with the tank A, the pipes

F F', with valves F², arranged to operate substantially as and for the purpose set forth.

3. The combination and arrangement of the sliding bolts G and levers G², substantially as and for the purpose set forth.

4. The valve E, attached to the end of the vertical shaft E', having its bearings in the screw-threads at the top of the tank, and operated by means of the wheel E², substantially as set forth.

5. The chain-stoppers composed of the jaws H, links H', bar H², link H³, and lever H⁴, substantially as and for the purpose set forth.

6. In combination with the elements in the preceding clause, the angle-irons $h$, with fingers $h'$ and pivoted clutch H⁶, substantially as and for the purpose set forth.

F. W. BEERS.

Witnesses:
W. W. WALSH,
CHAS. K. FRENCH.